(12) United States Patent
Kakadia et al.

(10) Patent No.: US 8,761,163 B2
(45) Date of Patent: Jun. 24, 2014

(54) COMMUNICATION ROUTING (75) Inventors: Deepak Kakadia, Union City, CA (US);
Thomas H. K. Tan, San Jose, CA (US);
Benjamin James Parker, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1031 days.

(21) Appl. No.: 12/485,448

(22) Filed: Jun. 16, 2009

(65) Prior Publication Data

US 2010/0316022 A1  Dec. 16, 2010

(51) Int. Cl.
*H04L 12/28* (2006.01)
(52) U.S. Cl.
USPC ............ 370/389; 370/338; 370/400; 370/401
(58) Field of Classification Search
USPC .................. 370/310–350, 351, 389, 400, 401
See application file for complete search history.

(56) References Cited

U.S. PATENT DOCUMENTS

| 5,079,760 | A  | * | 1/1992  | Nemirovsky et al. ......... 370/238 |
| 6,744,767 | B1 | * | 6/2004  | Chiu et al. ................ 370/395.21 |
| 2003/0128710 | A1 | * | 7/2003  | Fedyk et al. .................. 370/400 |
| 2003/0190915 | A1 | * | 10/2003 | Rinne et al. .................... 455/436 |
| 2004/0266387 | A1 | * | 12/2004 | Matusz ........................ 455/403 |
| 2006/0159021 | A1 | * | 7/2006  | Asghar et al. ................. 370/237 |
| 2008/0205345 | A1 | * | 8/2008  | Sachs et al. .................. 370/332 |
| 2009/0299788 | A1 | * | 12/2009 | Huber et al. ..................... 705/7 |
| 2011/0243024 | A1 | * | 10/2011 | Osterling et al. ............. 370/252 |

* cited by examiner

*Primary Examiner* — Andrew Chriss
*Assistant Examiner* — Kenan Cehic (57) ABSTRACT

A method includes identifying a number of nodes in a network, where the nodes may correspond to cellular communication sites. The method may also include selecting some of the nodes as potential hub nodes and determining, for each of the potential hub nodes, a bandwidth needed to forward traffic from the potential hub node to a mobile switching office. The method may further include determining, for each of the potential hub nodes, bandwidths needed to forward traffic from the potential hub node to other ones of the nodes and calculating, for each of the potential hub nodes, costs or latencies associated with forwarding traffic from the potential hub node to the mobile switching office and to other ones of the nodes. The method may also include selecting a hub node based on the calculated costs and/or latencies.

14 Claims, 9 Drawing Sheets

COMMUNICATION ROUTING

BACKGROUND INFORMATION

Wireless carrier service providers typically route data from cell sites to a mobile switching center in a point-to-point manner in which all cell sites are directly connected to a mobile switching center. In many conventional systems, the wireless carrier forwards data from each cell site to the mobile switching center using time division multiplexed (TDM) based transport over, for example, T1 links. As data volume and voice volume are increasing, latency is increasing and more traffic is being dropped by wireless carrier service providers.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to a network architecture in which a group of nodes are located relatively close to one another. In one exemplary implementation, the nodes may be cellular communication sites that receive wireless signals from end user devices. A hub node may be selected from the group of nodes and each other node may be coupled to the hub node in a star configuration. For example, each node may include a direct connection to the hub node. When the hub node receives a communication, the hub node determines whether to forward the communication on to a switching office or forward the communication back to one of the nodes in the group of nodes. For example, if the destination of the communication is associated with one of the nodes, the hub node may forward the communication to that particular node. Otherwise, the hub node may forward the communication to another switching device that will forward the communication on toward its intended destination.

Figure 1:
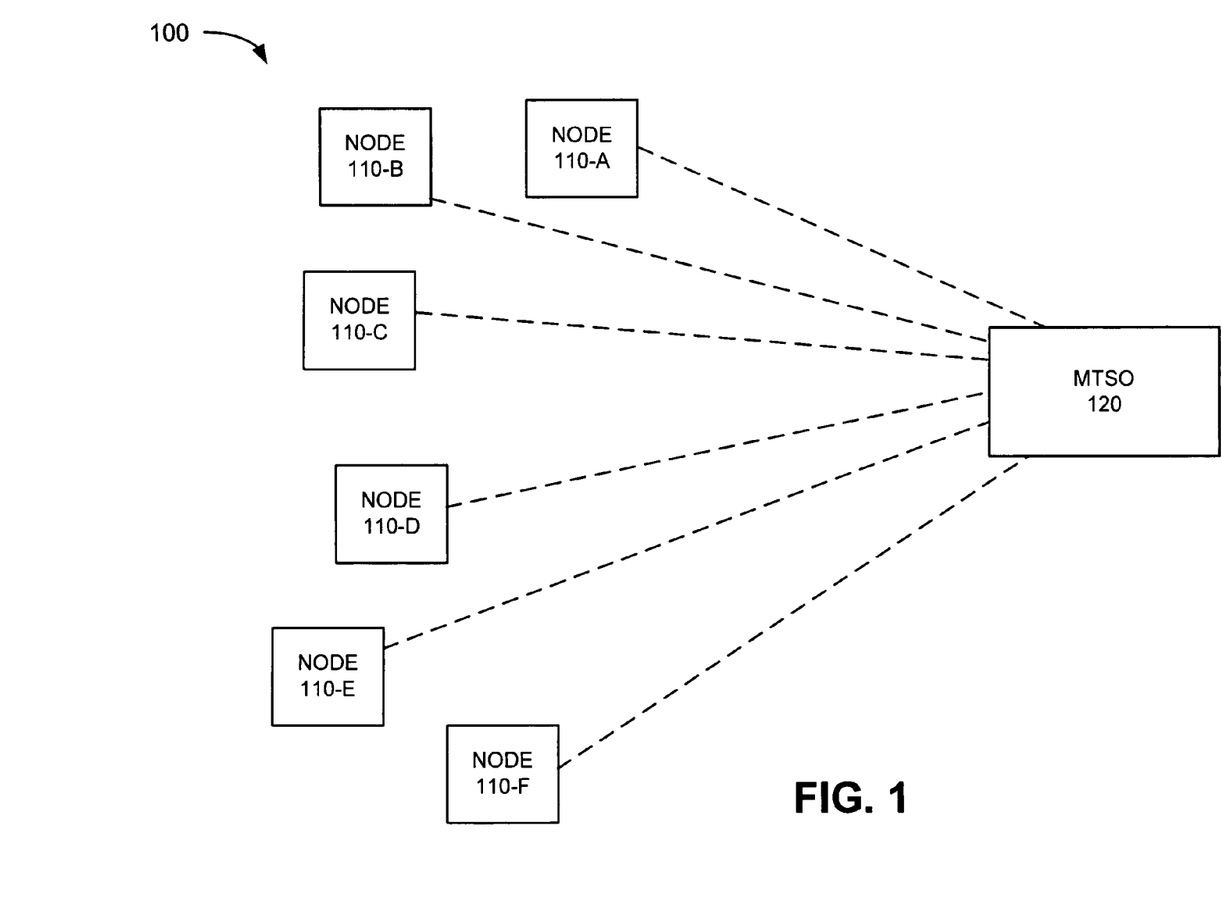
FIG. 1 illustrates an exemplary network in which systems and methods described herein may be implemented.

FIG. 1 is a block diagram of an exemplary network 100 in which systems and methods described herein may be implemented. Network 100 may include a number of nodes 110-A through 110-F, referred to collectively as nodes 110 and individually as node 110 or node 110-N (where N represents any alphanumeric value). Network 100 may also include a mobile telephone switching office (MTSO) 120

In an exemplary implementation, each node 110 (also referred to herein as cell site 110) may represent a cellular base station that includes one or more antennas that receive wireless signals, such as radio frequency (RF) signals from end user devices (not shown in FIG. 1), such as cell phones, personal digital assistants (PDAs), laptop computers, personal computers (PCs), etc. In one implementation, each of nodes 110 may represent an evolved nodeB (eNodeB) that supports voice and data services in a third generation partnership project (3GPP) based network or a long term evolution (LTE) based network. However, implementations described herein may be applicable to any type of network and nodes.

MTSO 120 may receive communications from nodes 110-A through 110-F and may forward the communications on toward their intended destination. For example, MTSO 120 may be coupled to the public switched telephone network (PSTN), an Internet protocol (IP) based network, such as the Internet, or any other number of networks. In an exemplary implementation, MTSO 120 may include a serving gateway (SGW) that acts as an interface between a wireless network and an IP based network and identifies a destination for a received communication. MTSO 120 may also include a packet data network (PDN) gateway (GW) that provides connectivity to an external packet data network.

One or more of nodes 110 may communicate directly with MTSO 120 via a wired link, as described in detail below. For example, each of the dotted lines in FIG. 1 may represent a potential connection from one of nodes 110-A to 110-F to MTSO 120. In an exemplary implementation, nodes 110 that are located relatively close to each other may represent a cluster or group of cell sites that receive communications from end user devices. In one implementation, a hub may be selected for the cluster of nodes 110 such that communications from nodes 110 are forwarded to the selected hub. The hub node may forward some of the communications to MTSO 120 and other ones of the communications directly to other ones of nodes 110 that are destination nodes for a received communication, as opposed to each node 110 forwarding all communications directly to MTSO 120.

For example, in a conventional network, each of nodes 110 connects to MTSO 120 via a point-to-point topology. That is, each node 110 is directly connected to MTSO 120 via a wired link. In accordance with an exemplary implementation, only one of nodes 110 (i.e., the hub node) within a group of nodes 110 may be directly connected to MTSO 120. Having a single one of nodes 110 connected to MTSO 120 may allow traffic to be transmitted in a much more efficient manner, as described in detail below.

The exemplary network configuration illustrated in FIG. 1 is provided for simplicity. It should be understood that a typical network 100 may include more or fewer nodes 110 and more MTSOs 120 than illustrated in FIG. 1. For example, a conventional network 100 may include hundreds of nodes 110 and ten or more MTSOs 120. Network 100 may also include additional elements, such as routers, gateways, switches, etc., that aid in routing traffic toward its intended destination.

Figure 2:
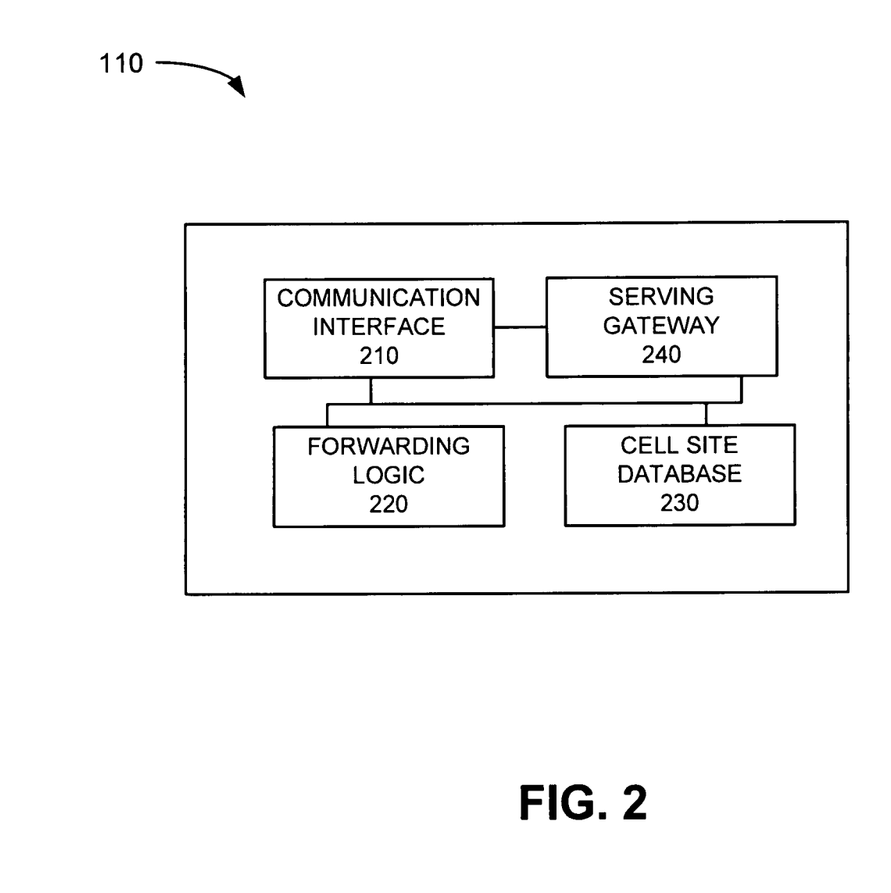
FIG. 2 illustrates an exemplary configuration of a node of FIG. 1.

FIG. 2 illustrates an exemplary configuration of one of nodes 110, such as a hub node. Referring to FIG. 2, node 110 may include communication interface 210, forwarding logic 220, cell site database 230 and serving gateway 240. The configuration illustrated in FIG. 2 is provided for simplicity. In other implementations, more or fewer components may be included in node 110. For example, node 110 may include one or more antennas for receiving and forwarding RF signals.

Communication interface 210 may include any transceiver-like mechanism that enables node 110 to communicate with other devices and/or systems. For example, communication interface 210 may include one or more RF transmitters, receivers and/or transceivers and one or more antennas for transmitting and receiving RF data to and from end user devices. Communication interface 210 may also include mechanisms for communicating with other devices, such as other nodes 110 and/or MTSO 120 via wired connections (e.g., T1 connections). Communication interface 210 may further include a modem or an Ethernet interface to a LAN.

Forwarding logic 220 may include one or more logic devices that receive communications from other nodes 110 and identify forwarding information for the received communications. For example, a communication received by node 110-A may be destined for node 110-F. In this case, forwarding logic 220 may interact with cell site database 230 and/or serving gateway 240 to identify the appropriate output destination device. Forwarding logic 220 and/or serving gateway 240 may then forward the communication on toward its destination via communication interface 210.

Cell site database 230 may include one or more databases that identify other nodes/cell sites 110 in network 100 that may be included in a cluster or group of nodes that are located relatively close to one another, as compared to the distance to MTSO 120. For example, in one implementation, cell site database 230 may store information identifying nodes 110 that are part of a group of nodes that will communicate with a hub node, as opposed to MTSO 120, for inter-cell traffic, as described in detail below.

Serving gateway (SGW) 240 may include one or more logic devices that act as a gateway to other devices in network 100. For example, SGW 240 may act as a termination point or interface for IP connections between mobile phones and an IP-based network. Forwarding logic 220, as described above, may interact with SGW 240 and cell site database 230 to identify an appropriate destination device and routing information for an incoming communication.

As described above, the configuration in FIG. 2 is exemplary only. It should be understood that node 110 may include more or fewer components than illustrated in FIG. 2. For example, in some implementations, only a node 110 acting as a hub node may include cell site database 230 and SGW 240. In addition, in some implementations, the functions described as being performed by one device may be performed by multiple devices or vice versa. For example, in some implementations, the functions of forwarding logic 220 and SGW 240 may be combined into a single device, such as SGW 240. In each scenario, nodes 110 may communicate with one another so that inter-cell traffic may be forwarded between nodes 110 and on to a destination end user device without first being forwarded to MTSO 120, as described in detail below.

Nodes 110, as described above, may receive communications from end user devices and forward the communications to destination devices. In an exemplary implementation, a network engineer associated with network 100 may divide nodes 110 in network 100 into geographic zones or clusters that include a hub that may be used to optimize the transmission of communications in network 100, as described in detail below.

Figure 3:
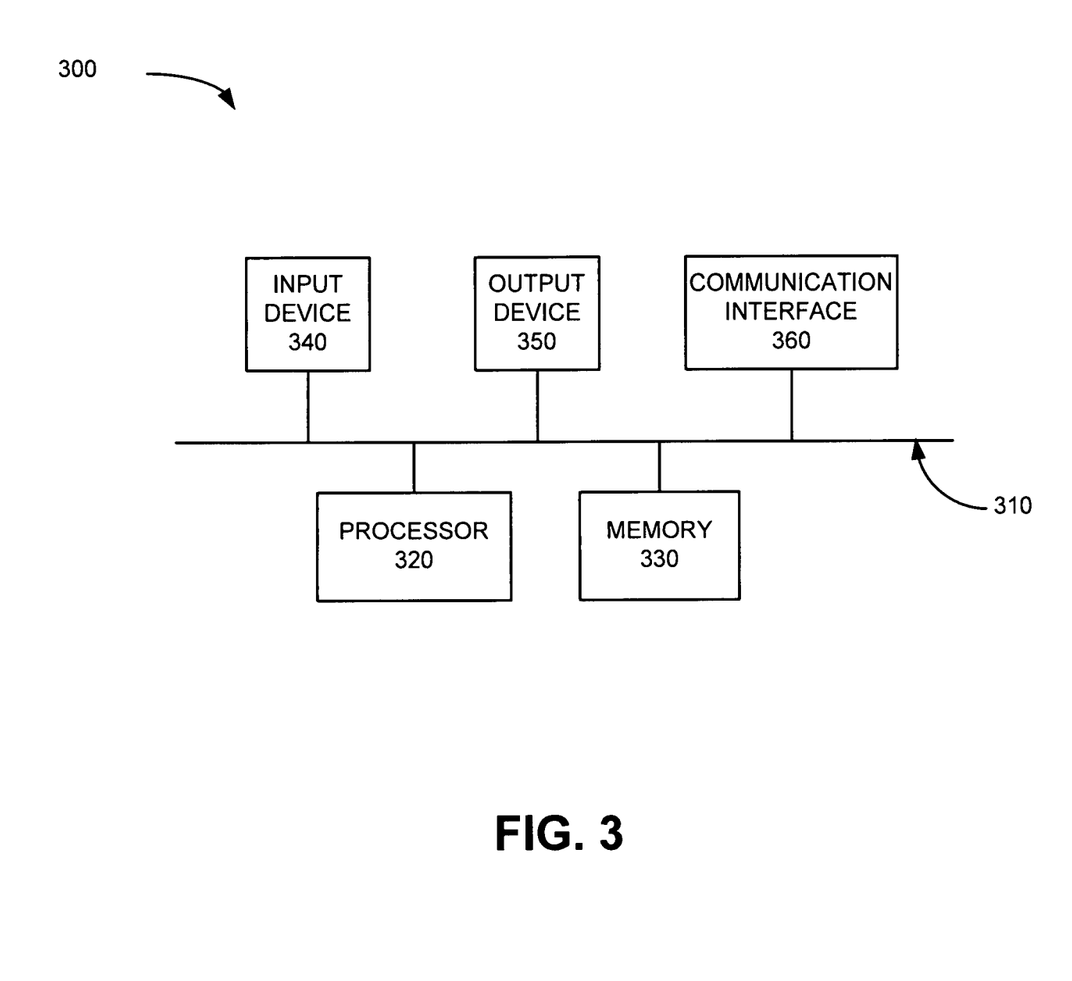
FIG. 3 illustrates an exemplary device via which a hub node may be selected for the network of FIG. 1.

FIG. 3 illustrates an exemplary configuration of a computer device 300 that may be used by a network engineer associated with monitoring network 100 to identify an optimal hub node. Referring to FIG. 3, device 300 may include a bus 310, a processor 320, a memory 330, an input device 340, an output device 350 and a communication interface 360. The exemplary configuration illustrated in FIG. 3 is provided for simplicity. It should be understood that device 300 may include more or fewer devices than illustrated in FIG. 3.

Bus 310 may include a path that permits communication among the elements of device 300. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium and its corresponding drive.

Input device 340 may include a mechanism that permits a user to input information to device 300, such as a keyboard, a keypad, a mouse, a pen, a microphone, a touch screen, voice recognition and/or biometric mechanisms, etc. Output device 350 may include a mechanism that outputs information to the user, including a display, a printer, a speaker, etc.

Communication interface 360 may include any transceiver-like mechanism that device 300 may use to communicate with other devices and/or systems. For example, communication interface 360 may include mechanisms for communicating via a network to one or more of nodes 110 and/or MTSO 120. Communication interface 360 may also include a modem or an Ethernet interface to a LAN. In addition, communication interface 360 may include other mechanisms for communicating via a wireless network.

A network engineer may interact with device 300 to identify an optimal hub site associated with network 100. The hub site may then be used to optimize the flow of communications in network 100, as described in detail below.

Figure 4:
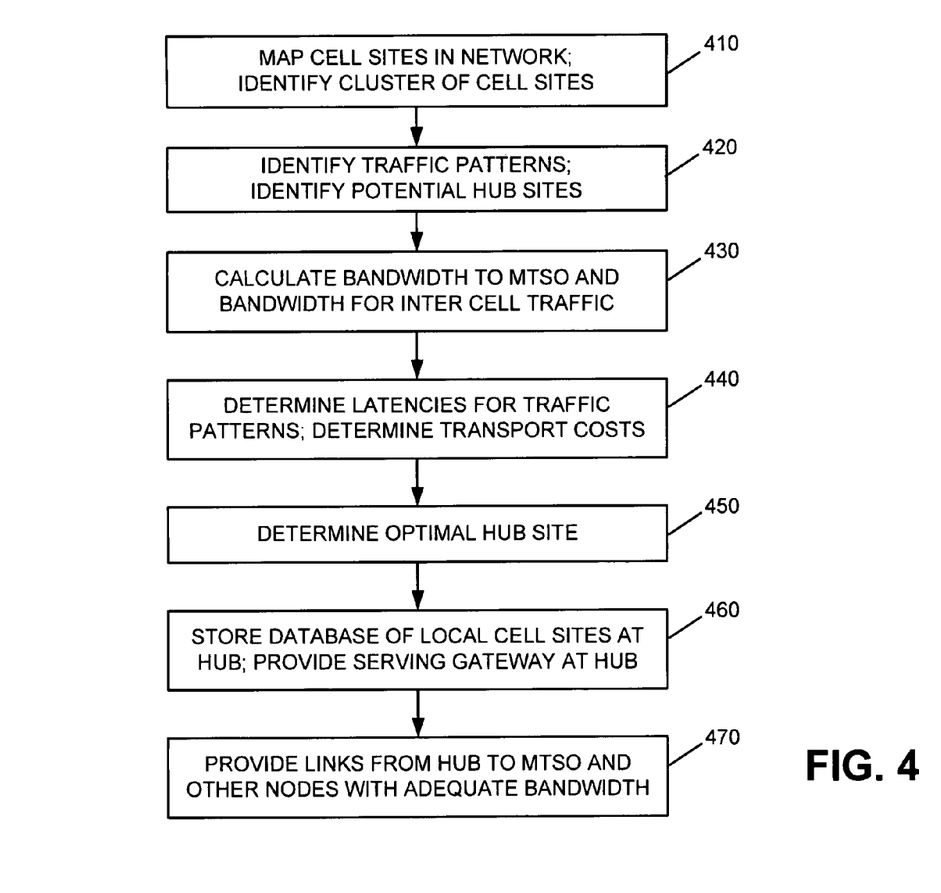
FIG. 4 is a flow diagram illustrating exemplary processing associated with selecting a hub node for the network of FIG. 1.

FIG. 4 is a flow diagram illustrating exemplary processing associated with identifying a hub node in network 100. Processing may begin by a network engineer (or another party associated with monitoring network 100) identifying the network topology of network 100 and mapping the network topology (act 410). For example, in one implementation, the network engineer may use device 300 to map network 100 to scale. In an exemplary implementation, the network engineer may input location values associated with nodes 110 and MTSO 120 to device 300 via input device 340. Processor 320 may then generate an output mapping of network 100 and provide the output via output device 350. For example, output device 350 may output a graphical representation of network 100, as illustrated in FIG. 5.

Figure 5:
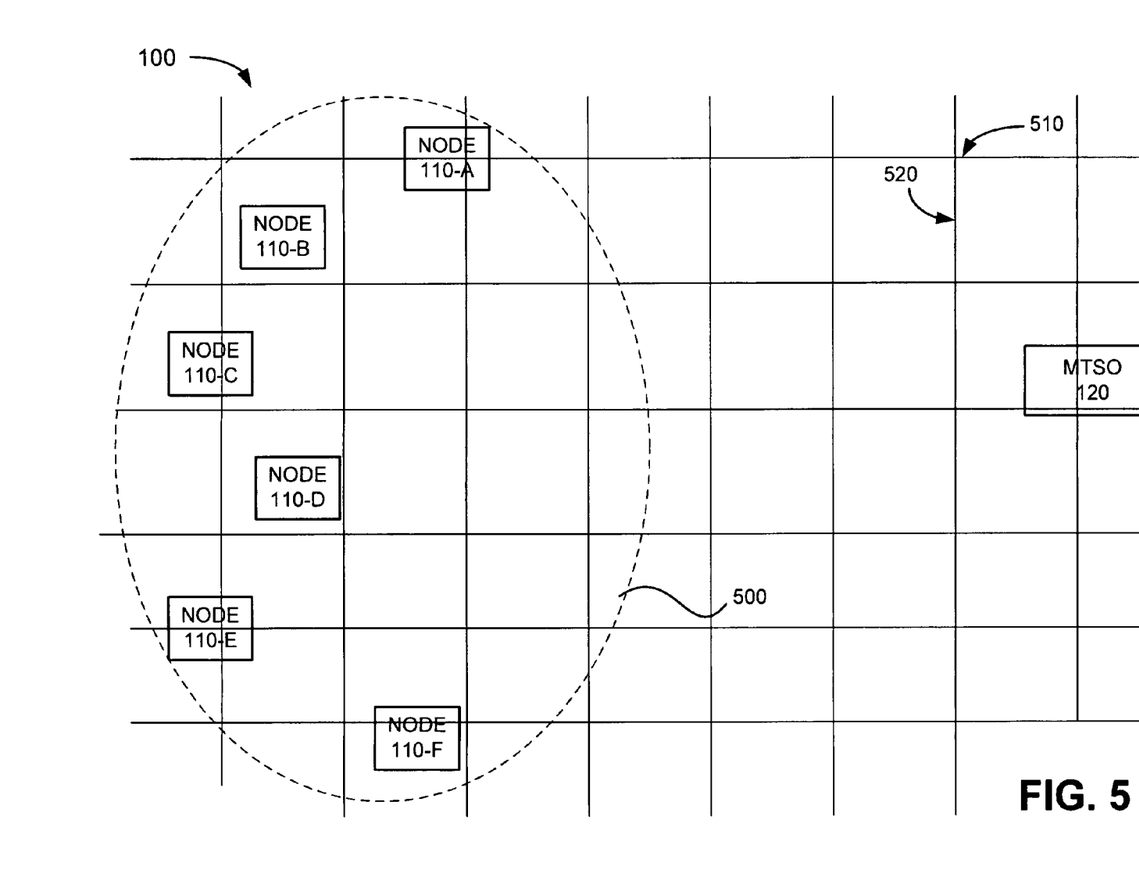
FIG. 5 is a block diagram illustrating an exemplary network mapping associated with the network of FIG. 1.

Referring to FIG. 5, output device 350 may display a graphical representation of network 100 that includes grid lines 510 that run laterally and grid lines 520 that run longitudinally. In an exemplary implementation, lateral grid lines 510 may represent one mile increments and longitudinal grid lines 520 may also represent one mile increments. However, the particular scale and spacing of grid lines may be chosen based on, for example, the number of nodes 110 in network 100, the proximity of nodes 110 to one another, the proximity of node 110 to MTSO 120 and/or other factors. In each case, the physical distance between nodes 110-A through 110-F and the distance between each of nodes 110-A through 110-F and MTSO 120 may be determined.

The network engineer may then identify a cluster of nodes 110 that are located relatively close to each other (act 410). For example, referring to FIG. 5, nodes 110-A through 110-F (shown within dotted area or cluster 500) are located relatively close to one another, as compared to the distance from nodes 110 to MTSO 120. In this example, the network engineer may identify nodes 110-A through 110-F as a cluster.

Figure 6:
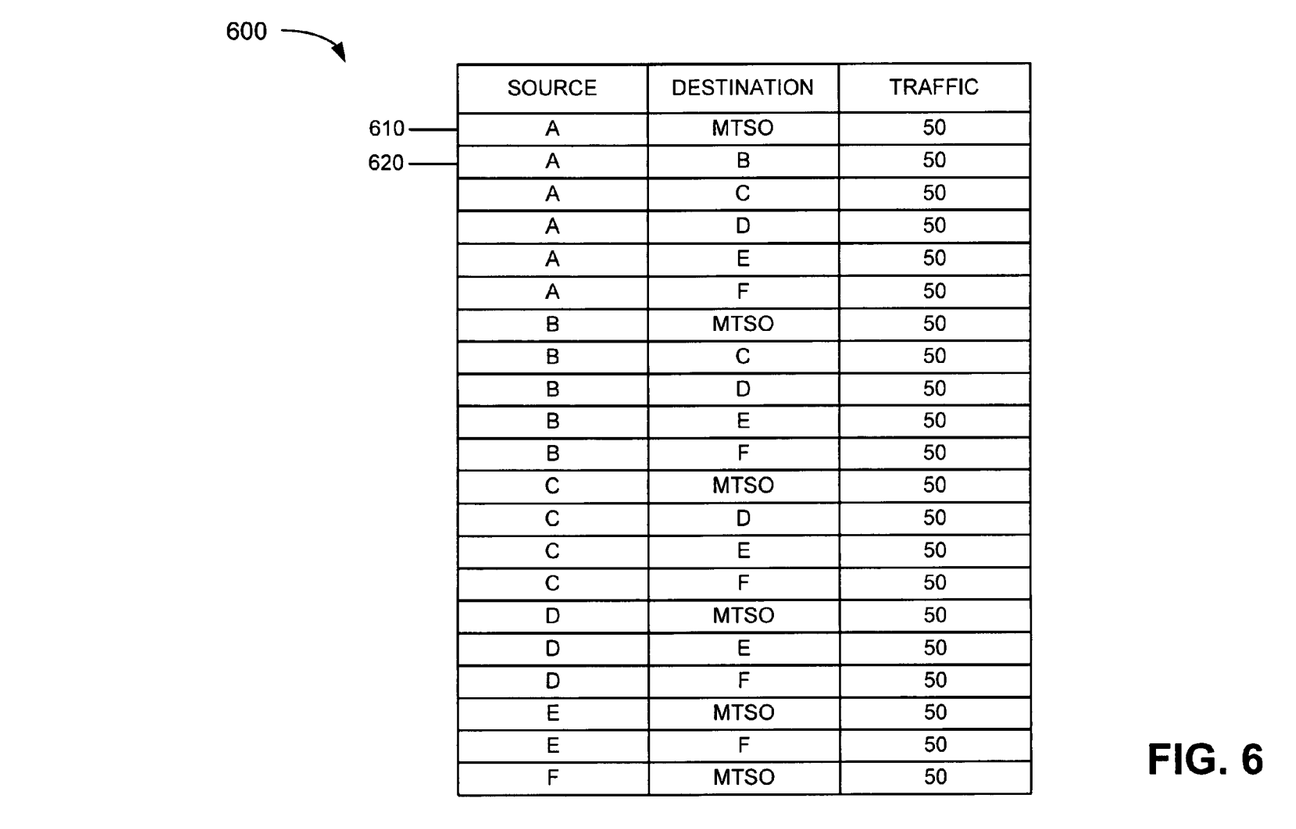
FIG. 6 is a table storing exemplary data flow information for the network of FIG. 1.

The network engineer may then identify actual traffic and/or traffic patterns in network 100 (act 420). For example, the network engineer may access traffic data in network 100 to identify inter-node (also referred to herein as inter-cell) traffic patterns, as well as cell 110-to-MTSO 120 traffic patterns. For example, FIG. 6 illustrates an exemplary table 600 illustrating traffic in network 100. The data in table 600 may represent average traffic volumes transmitted over a period of time in network 100. Alternatively, the data in table 600 may represent maximum traffic volumes transmitted during a period of time. In either case, the data in table 600 provides a network engineer with actual traffic volumes forwarded in network 600. It is noted that table 600 illustrates traffic between a source and destination node. However, the traffic volume stored in table 600 includes traffic transmitted in both directions.

For example, referring to FIG. 6, entry 610 in table 600 indicates that that traffic volume (e.g., average over a period of time or maximum over a period of time) transmitted from node 110-A to MTSO 120 and from MTSO 120 to node 110-A is 50 megabits per second (Mb/s). Entry 620 illustrates that traffic volume transmitted from node 110-A to node 110-B and from node 110-B to node 110-A is also 50 Mb/s. It is also noted that each of the traffic values listed in table 600 is the same (i.e., 50 Mb/s) for simplicity. In typical networks, the traffic volumes between various end points may vary greatly. Referring back to table 600, in this example, the bulk of the traffic in network 100 is inter-cell traffic. That is, the vast majority of the traffic is being transmitted between nodes 110-A through 110-F, as opposed to being transmitted from one of nodes 110 to MTSO 120

The network engineer may then identify potential hub sites (act 420). For example, in network 100 illustrated in FIG. 5, each of nodes 110-A through 110-F located in cluster 500 may be a potential hub for cluster 500. The hub may be selected to optimize (i.e., maximize or minimize) various parameters. As one example, the network engineer may wish to minimize cost and latency associated with transmitting traffic in network 100.

In an exemplary implementation, assume that the set of all cell sites 110 in network 100 is defined by "S." That is S=A, B, C, D, E and F. Further assume that the sum of all traffic from each cell site in S to MTSO 120 is represented by TMTSO, and that the sum of all cell to cell traffic is represented by TC. For example, assume that TC=TaC=TbC=TcC=TdC=TeC=TfC, where TaC is equal to the sum of all traffic from cell site A to all other cell sites S-A; TbC is equal to the sum of all traffic from cell site B to all other cell sites S-B; TcC is equal to the sum of all traffic from cell site C to all other cell sites S-C; TdC is equal to the sum of all traffic from cell cite D to all other cell sites S-D; TeC is equal to the sum of all traffic from cell site E to all other cell sites S-E; and TfC is equal to the sum of all traffic from cell cite F to all other cell sites S-F.

Figure 7:
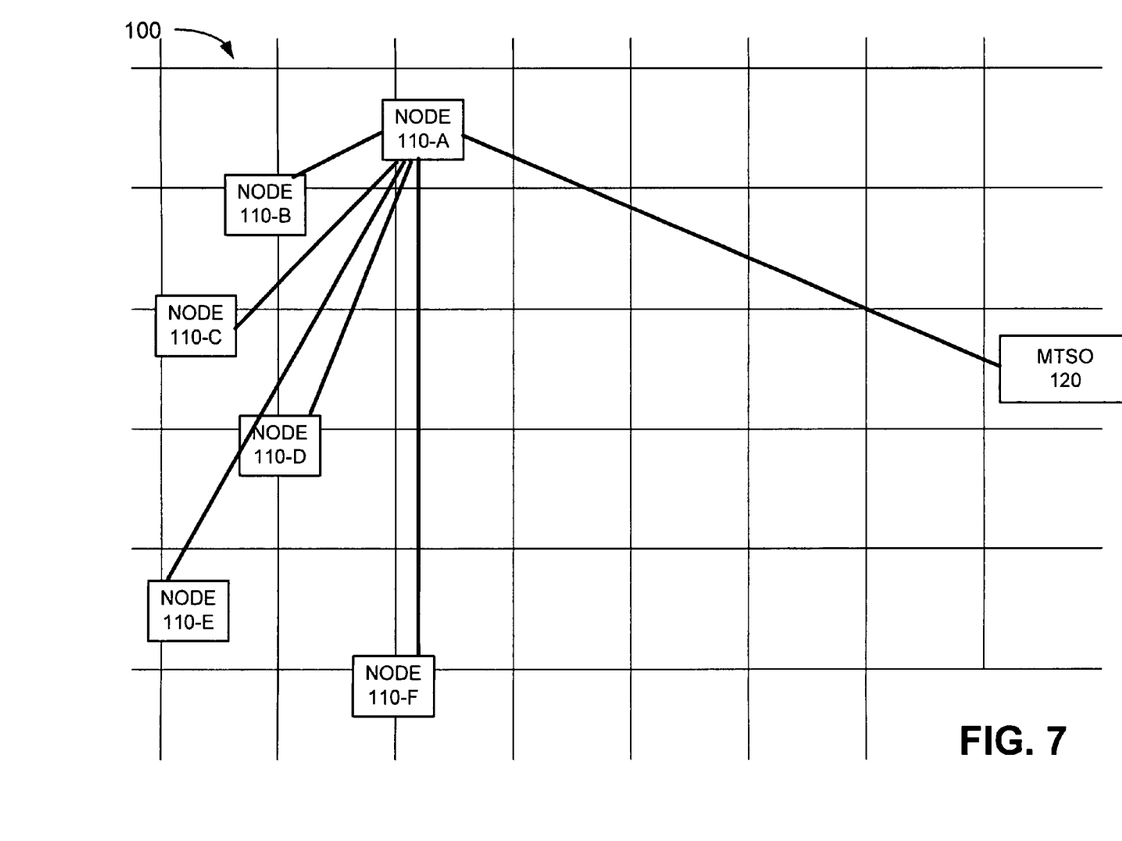
FIG. 7 is a diagram of the network of FIG. 1 configured with a potential hub node.

After potential hub sites are selected, a network topology may be drawn to connect all other cell sites to each of the potential hub sites. For example, continuing with the example above in which each of nodes 110-A through 110-F is a potential hub site, the network engineer may generate, using device 300, a network topology in which all of nodes 110-B through 110-F are connected to node 110-A in a star configuration, and node 110-A is connected to MTSO 120, as illustrated in FIG. 7. The bandwidth necessary to route all traffic between node 110-A and MTSO 120 (i.e., TMTSO) may then be calculated (act 430).

For example, continuing with the example illustrated in table 600, processor 320 may access table 600 and determine that the total traffic volume between nodes 110-A through 110-F and MTSO 120 is 300 Mb/s. That is, traffic between each of nodes 110-A through 110-F and MTSO 120 is 50 Mb/s, for a total of 300 Mb/s. In this example, a 300 Mb/s bandwidth may be required to transmit all traffic between node 110-A and MTSO 120. In some instances, the actual bandwidth needed to transmit traffic between node 110-A and MTSO 120 may be reduced based on statistical multiplexing. For example, since the data in table 600 may represent average traffic values or maximum traffic values, the originally calculated 300 Mb/s value may be reduced based on the network engineer's real world knowledge of traffic in network 100. That is, the network engineer may know that at any given time, traffic being transmitted between each of the nodes 110-A through 110-F may not actually be the full 50 Mb/s of traffic indicated in table 600. Therefore, in some instances, the network engineer may reduce the calculated bandwidth needed for the link from node 110-A to MTSO 120 by a factor of, for example, 0.7 or less. In this example, the required bandwidth may be reduced, for example, to a value ranging from 200 Mb/s to 300 Mb/s (e.g., 250 Mb/s).

Next, the bandwidth required to route all inter-cell traffic in network 100 may be calculated (act 430). For example, processor 320 may access table 600 and determine the bandwidth required for routing traffic between node 110-B and each of nodes 110-A, 110-C, 110-D, 110-E and 110-F may be 50 Mb/s, for a total of 250 Mb/s. In this case, the link between node 110-B and node 110-A may be set to support a 250 Mb/s bandwidth. Similarly, the link from node 110-C to node 110-A may be set to support a 250 Mb/s bandwidth, the link from node 110-D to node 110-A may be set to support a 250 Mb/s bandwidth, the link from node 110-E to node 110-A may be set to support a 250 Mb/s bandwidth, and the link from node 110-F to node 110-A may be set to support a 250 Mb/s bandwidth. Similar to the discussion above with respect to the link from node 110-A to MTSO 120, in some instances, the originally calculated values of 250 Mb/s may be reduced using statistical multiplexing. For example, in this instance, the network engineer may reduce the calculated bandwidth by a factor of 0.7 or less. In this example, the required bandwidth may be reduced, for example, to a value ranging from 150 Mb/s to 250 Mb/s (e.g., 200 Mb/s).

Processor 320 may then repeat the bandwidth calculations with each of nodes 110-B through 110-F acting as a hub site. That is, processor 320 may determine bandwidth requirements with each of the potential hub sites having a single connection to MTSO 120 and each hub site being connected to each other node 110 in set S via a star configuration.

After calculating both hub to MTSO 120 and inter-cell (e.g., node 110 to other nodes 110) bandwidth requirements for each potential hub site, latencies associated with all traffic patterns may be determined (act 440). For example, processor 320 and/or the network engineer may access latency or delay information associated with transmitting traffic between nodes 110-B and 110-A, nodes 110-C and 110-A, nodes 110-D and 110-A, nodes 110-E and 110-A and nodes 110-F and node 110-A. Processor 320 may also determine the latency or delay associated with transmitting traffic between each of the potential hub nodes and MTSO 120. This information may be generated based on actual latency data collected over a period of time and stored for access by processor 320. In other instances, the latency data may be based on simulations involving routing communications in network 100. In either case, processor 320 may calculate the latencies for the inter-cell communications.

Transport costs based on bandwidth requirements may then be determined (act 440). For example, processor 320 and/or the network engineer may determine the transport costs associated with transmitting data from each potential hub site to MTSO 120 and the transport costs associated with transmitting data between each potential hub site and each other node 110 in the cluster. For example, processor 320 and/or the network engineer may determine the transport costs associated with transmitting data between nodes 110-B and 110-A, nodes 110-C and 110-A, nodes 110-D and 110-A, nodes 110-E and 110-A and nodes 110-F and 110-A. The transport costs may be based on any number of factors. For example, the transport costs may generally be based on the transmission distance. In other instances, the transport costs may be fixed based on a region, or based on a combination of a fixed cost along with a distance based component. In each case, processor 320 may determine the costs associated with each routing communications to and from each potential hub site.

An optimal hub site may then be identified (act 450). For example, after processor 320 has determined the latency and cost information, the network engineer may identify the optimal hub site based on minimizing cost and/or latency, depending on the particular network requirements. In some instances, processor 320 may automatically select the optimal hub site based on factors provided by the network engineer.

Figure 8:
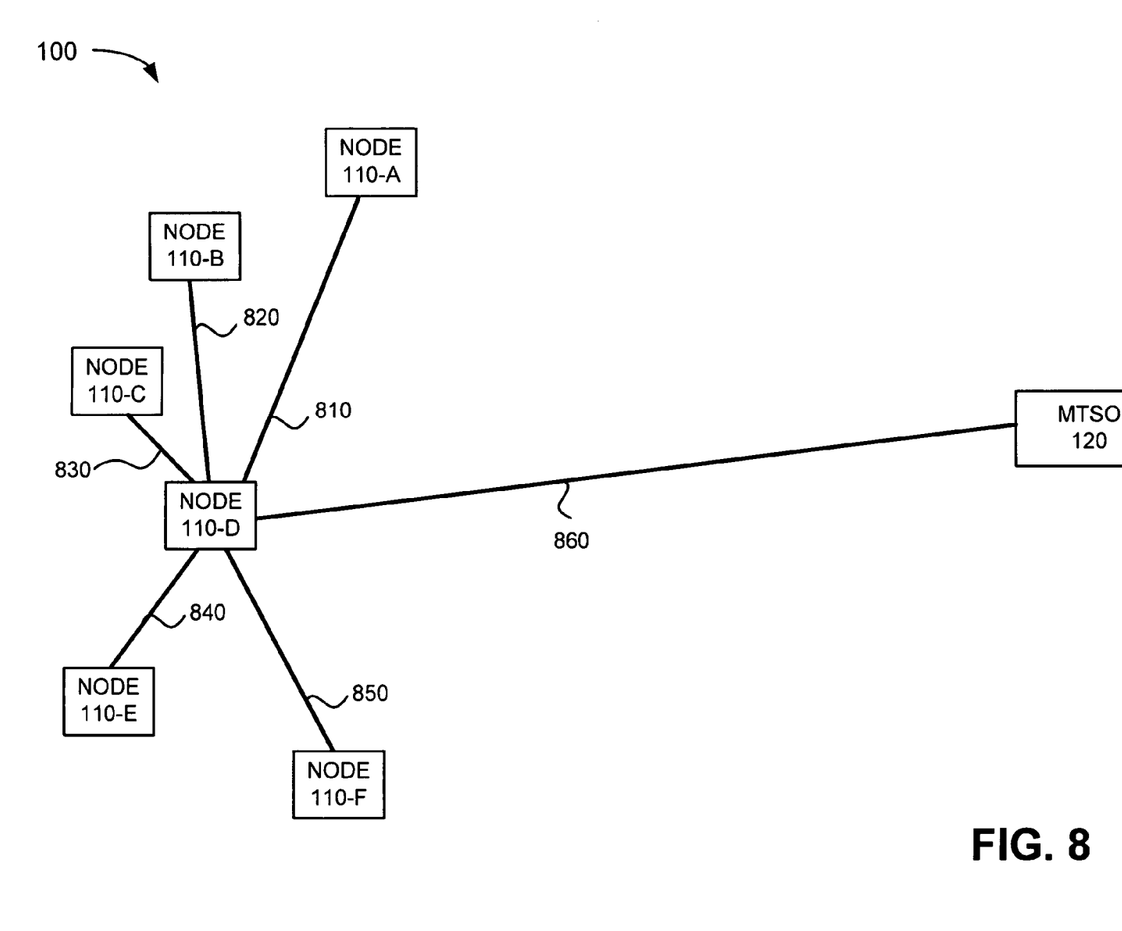
FIG. 8 is a diagram of the network of FIG. 1 with a selected hub node.

In this example, assume that node 110-D is selected as the optimal hub site. In this case, each of nodes 110-A, 110-B, 110-C, 110-E and 110-F may be coupled to node 110-D in a star configuration, and node 110-D may be coupled to MTSO 120, as illustrated in FIG. 8. That is, nodes 110-A, 110-B, 110-C, 110-E and 110-F may be directly coupled to node 110-D via links 810-850, respectively. Node 110-D may also be directly coupled to MTSO 120 via link 860. It should be understood that the term "directly coupled" does not preclude the use of intermediate devices between the various nodes 110 and hub node 110-D. For example, various amplifiers or other devices may be included in the links to hub node 110-D.

In an exemplary implementation, once the hub site is selected, cell site database 230 may be stored in the selected hub site (act 460). For example, continuing with the example above in which node 110-D is the hub site, cell site database 230 may be stored in node 110-D. As discussed above with respect to FIG. 2, cell site database 230 may include a list of cell sites identifying the cell sites in the cluster (i.e., cluster 500). In some implementations, SGW 240 may also be provided in node 110-D (act 460). For example, as described briefly above, SGW 240 may provide a termination point or interface for an IP connection between a mobile phone and an IP-based network. In some implementations, the selected hub node (i.e., node 110-D in this example) may be configured to include an SGW similar to an SGW typically located at an MTSO, such as MTSO 120. Alternatively, once a hub site is selected, the selected node may be configured to include a modified or smaller version of an SGW typically located at a MTSO, such as MTSO 120. That is, since SGW 240 may only be serving a relatively small number of nodes, SGW 240 may not require connection information typically associated with a MTSO, such as MTSO 120.

In some implementations, after the hub site is selected, the network engineer may determine if a link between node 110-D and MTSO 120 and if links between node 110-D and the other nodes 110 having adequate bandwidth are in existence. For example, the network engineer may determine whether direct wired links between node 110-D and MTSO 120, and between node 110-D and nodes 110-A, 110-B, 110-C, 110-E and 110-F having the bandwidth calculated above at act 430 are in existence. If not, such links may be provisioned (act 470). For example, wired links, such as T1 links or any other type of wired link, may be provided to ensure that adequate capacity is provided between hub node 110-D and the other nodes 110 and MTSO 120.

In each case, once a hub site is selected and configured to handle communications from a number of other nodes, and links having adequate capacity are in place, the hub site (i.e., node 110-D in this example) may identify a communication destined for another cell, and simply forward the communication to the appropriate cell site, as described in detail below. This may help save significant resources in network 100. That is, sending cell to cell traffic via hub 110-D, as opposed to sending each communication to MTSO 120 and having MTSO 120 forwarding the communication back to the appropriate cell site may help reduce congestion and save costs.

Figure 9:
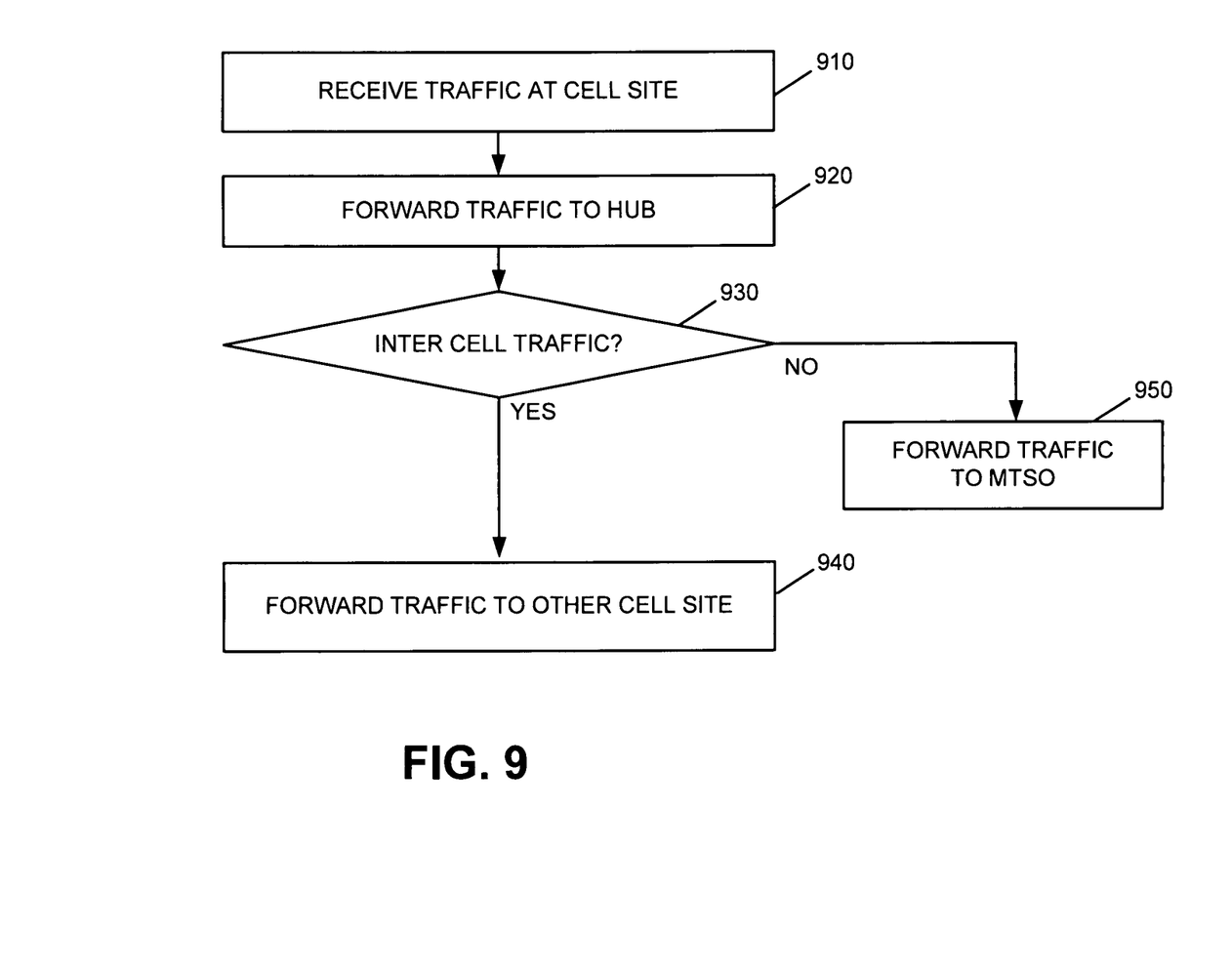
FIG. 9 is a flow diagram illustrating exemplary processing associated with routing data in the network of FIG. 8.

FIG. 9 is a flow diagram illustrating exemplary processing with forwarding traffic in network 100. In this example, assume that node 110-D was selected as the hub site. Processing may begin with a node 110, such as node 110-C receiving a communication from an end user device (act 910). The communication may be a voice call, a text-based communication (e.g., a text message, instant message (IM), email, etc.), a multi-media based communication (e.g., an IM), etc. Node 110-C may forward the communication to node 110-D via link 830 illustrated in FIG. 8 (act 920).

Node 110-D may receive the communication and determine whether the communication is an inter-cell communication (act 930). For example, forwarding logic 220 (FIG. 2) may determine whether the communication is destined for a cell site identified in cell site database 230. Assume that forwarding logic 230 determines that the communication is destined for node 110-E. In this case, forwarding logic 220 forwards the communication to node 110-E via link 840 illustrated in FIG. 8 (act 940). That is, hub node 110-D effectively performs the function of a MTSO and forwards the communication on toward its destination. This saves considerable costs and time as compared to forwarding every communication to MTSO 120 and having MTSO 120 forward the call back to a node that may be located relatively close to the node 110 that received the communication. For example, assume that the distance between node 110-C and node 110-D is one mile and that the distance between node 110-D and node 110-E is one mile, while the distance between each of nodes 110-C and 110-E and MTSO 120 is 25 miles. In this example, forwarding the communication via hub node 110-D results in a total transmission distance of two miles, as opposed to a transmission distance of 50 miles if the communication was sent to MTSO 120 and then back to node 110-E. Therefore, using hub node 110-D saves considerable transmission distance, as well as reduces latency.

Referring back to FIG. 9, assume that forwarding logic 220 determines that the communication is destined for another network, such as an IP network not included in cluster 500. In this case, node 110-D may forward the communication to MTSO 120 via link 860 illustrated in FIG. 8 (act 950). MTSO 120 may then forward the communication on toward its destination.

In the manner described above, communications that may have previously been forwarded to MTSO 120 may bypass MTSO 120 in favor of hub node 110-D. Since hub node 110-D is often located much closer to the two end nodes 110 involved in the communication, the communication may be transmitted between end user devices much more efficiently, thereby saving time and money.

Implementations described herein provide for identifying a hub node for a cluster of nodes located relatively close to one another. The hub node may then act as a gateway for forwarding communications in an efficient manner. This may also allow network service providers to forward more communications without having to drop calls.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to selecting potential hub nodes from a cluster of nodes. In some implementations, a number of potential MTSOs may be also be selected for communicating with the potential hub nodes. For example, the network engineer may select a number of different MTSOs as potential MTSOs to which a hub node will be coupled. In such instances, processor 320 may perform the processing described above with respect to FIG. 4 for a number of different MTSOs. That is, processor 320 may execute the algorithm described above to determine bandwidth requirements associated with forwarding communications to a number of different MTSOs. Latency and/or costs associated with transmitting communications from a selected hub node to the number of different MTSOs may then be determined. A network engineer and/or processor 320 may then compare cost and/or latency information associated with the different MTSOs to identify an optimal hub and an optimal MTSO for the hub.

Further, implementations have been described above with respect to using a network engineer to interface with device 300 to identify an optimal hub node and/or MTSO. In other instances, device 300 may be programmed to perform the processing described above without requiring input from the network engineer.

In addition, implementations have been described above with respect to connecting a hub to other nodes via a star configuration. In other implementations, nodes 110 may connect to a hub node in other ways. For example, in FIG. 8, node 110-A may be directly coupled to node 110-B via a wired link, node 110-B may be directly coupled to node 110-C via a wired link, node 110-C may be directly coupled to node 110-D via a wired link, node 110-D may be directly coupled to node 110-E via a wired link and node 110-E may be directly coupled to node 110-F via a wired link. In such implementations, communications between nodes 110-A through 110-F may still be forwarded without requiring transmission to MTSO 120. For example, a communication from node 110-B to hub node 110-D may be transmitted via node 110-C. In such instances, communications between nodes in a cluster may be routed to a hub node without requiring transmission to MTSO 120.

Further, while series of acts have been described with respect to FIGS. 4 and 9, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:

identifying a plurality of nodes in a network, wherein each of the plurality of nodes comprises an evolved node B (eNodeB);

selecting at least some of the nodes as potential hub nodes;

determining, for each of the selected potential hub nodes, a first bandwidth needed to forward traffic from the potential hub node to a first mobile switching office;

determining, for each of the selected potential hub nodes, bandwidths needed to forward traffic from the potential hub node to other ones of the plurality of nodes;

calculating, for each of the potential hub nodes, at least one of costs or latencies associated with forwarding traffic from the potential hub node to the first mobile switching office and to other ones of the nodes;

selecting a hub node from the potential hub nodes based on the calculated at least one of costs or latencies;

configuring the plurality of nodes, other than the hub node, to forward received communications to the hub node;

receiving, by the hub node, a first communication from one of the plurality of nodes;

accessing a database identifying a plurality of eNodeBs, by the hub node, to determine whether a destination eNodeB associated with the first communication is identified in the database;

forwarding, by the hub node, the first communication to an other one of the plurality of nodes without forwarding the first communication via the first mobile switching office, in response to determining that the destination eNodeB associated with the first communication is identified in the database;

identifying a second mobile switching office;

determining, for each of the selected potential hub nodes, a second bandwidth needed to forward traffic from the potential hub node to the second mobile switching office;

comparing, for each of the potential hub nodes, at least one of costs or latencies associated with forwarding traffic from the potential hub node to the first mobile switching office to at least one of second cost or latencies associated with forwarding traffic from the potential hub node to the second mobile switching office;

selecting a second hub node based on the at least one of costs or latencies and second costs or latencies; and selecting one of the first or second mobile switching offices to which the second hub node will forward communications based on the comparing.

2. The method of claim 1, further comprising:
receiving, by the hub node, a second communication from a second one of the plurality of nodes; and
forwarding, by the hub node, the second communication to the first mobile switching office when a destination of the second communication is not associated with one of the plurality of nodes.

3. The method of claim 1, wherein the determining a first bandwidth comprises:
calculating at least one of a maximum or average amount of traffic transmitted between each of the plurality of nodes and the first mobile switching office over a period of time.

4. The method of claim 3, wherein the determining a first bandwidth further comprising:
applying a factor to the calculated amount of traffic to determine the first bandwidth, wherein the factor reduces the calculated amount of traffic; and
providing a link having the first bandwidth from the hub node to the first mobile switching office.

5. The method of claim 1, wherein the determining bandwidths needed to forward traffic from the potential hub node to other ones of the plurality nodes comprises:
calculating a maximum or average amount of traffic transmitted from each of the nodes and all of the other ones of the plurality of nodes over a first period of time, the method further comprising:
providing a link, from each of the plurality of nodes other than the hub node, to the hub node, wherein each link has a bandwidth based on the calculated amount of traffic.

6. The method of claim 1, wherein the hub node includes a serving gateway.

7. A device, comprising:
a communication interface configured to receive communications from a plurality of evolved node Bs (eNodeBs);
logic configured to:
determine whether a destination associated with a received communication is associated with one of the plurality of eNodeBs,
forward the received communication to the one of the plurality of eNodeBs when the destination is associated with one of the plurality of eNodeBs, and
forward the received communication to a first mobile switching office when the destination is not associated with one of the plurality of eNodeBs; and
a database configured to store information identifying the plurality of eNodeBs,
wherein when determining whether a destination associated with a received communication is associated with one of the plurality of eNodeBs, the logic is configured to:
access the database to determine if the destination associated with the received communication is identified in the database, and
wherein the logic is further configured to:
identify a second mobile switching office,
determine a first bandwidth needed to forward traffic from the device to the first mobile switching office,
determine a second bandwidth needed to forward traffic from the device to the second mobile switching office,
compare at least one of costs or latencies associated with forwarding traffic from the device to the first mobile switching office to at least one of second cost or latencies associated with forwarding traffic from the device to the second mobile switching office, and
select one of the first or second mobile switching offices to which the device will forward communications based on the comparing.

8. The device of claim 7, wherein the logic comprises serving gateway logic.

9. The device of claim 8, wherein the serving gateway logic is configured to act as termination point or an interface for an Internet protocol (IP) based connection between a cellular phone and an IP network.

10. The device of claim 7, wherein the device acts as a hub for the plurality of eNodeBs, wherein each of the plurality of eNodeBs forwards received communications to the device.

11. A non-transitory computer-readable medium having stored thereon sequences of instructions which, when executed by a processor, cause the processor to:
identify a plurality of nodes in a network, wherein each of the plurality of nodes comprises an evolved node B (eNodeB);
select at least some of the nodes as potential hub nodes;
determine, for each of the selected potential hub nodes, a first bandwidth needed to forward traffic from the potential hub node to a first mobile switching office;
determine, for each of the selected potential hub nodes, bandwidths needed to forward traffic from the potential hub node to other ones of the plurality of nodes;
calculate, for each of the potential hub nodes, at least one of costs or latencies associated with forwarding traffic from the potential hub node to the first mobile switching office and to other ones of the nodes;
select a hub node from the potential hub nodes based on the calculated at least one of costs or latencies;
configure the plurality of nodes, other than the hub node, to forward received communications to the hub node, wherein the hub node is configured to:
receive a first communication from one of the plurality of nodes,
access a database identifying a plurality of eNodeBs to determine whether a destination eNodeB associated with the first communication is identified in the database,
forward the first communication to an other one of the plurality of nodes without forwarding the first communication via the first mobile switching office, in response to determining that the destination eNodeB associated with the first communication is identified in the database;
identify a second mobile switching office;
determine, for each of the selected potential hub nodes, a second bandwidth needed to forward traffic from the potential hub node to the second mobile switching office;
compare, for each of the potential hub nodes, at least one of costs or latencies associated with forwarding traffic from the potential hub node to the first mobile switching office to at least one of second cost or latencies associated with forwarding traffic from the potential hub node to the second mobile switching office;
select a second hub node based on the at least one of costs or latencies and second costs or latencies; and
select one of the first or second mobile switching offices to which the second hub node will forward communications based on the comparing.

12. The non-transitory computer-readable medium of claim 11, wherein when determining a first bandwidth, the instructions cause the processor to:

calculate at least one of a maximum or average amount of traffic transmitted between each of the plurality of nodes and the first mobile switching office over a period of time.

13. The non-transitory computer-readable medium of claim 12, wherein when determining the first bandwidth, the instructions further cause the processor to:
apply a factor to the calculated amount of traffic to determine the first bandwidth, wherein the factor reduces the calculated amount of traffic.

14. The non-transitory computer-readable medium of claim 11, wherein when determining bandwidths needed to forward traffic from the potential hub node to other ones of the plurality nodes, the instructions cause the processor to:
calculate a maximum or average amount of traffic transmitted from each of the nodes and all of the other ones of the plurality of nodes over a first period of time.

* * * * *